United States Patent [19]
Bartley

[11] Patent Number: 5,591,470
[45] Date of Patent: Jan. 7, 1997

[54] METHOD AND APPARATUS FOR DOCKING DOUGH

[75] Inventor: James Bartley, Alsip, Ill.

[73] Assignee: A.M. Manufacturing Company, Dolton, Ill.

[21] Appl. No.: 542,454

[22] Filed: Oct. 12, 1995

[51] Int. Cl.$^6$ .................................... A21C 11/12
[52] U.S. Cl. ................ 426/391; 426/496; 426/512; 426/549; 99/430; 99/432; 99/515; 425/364 R; 425/403.1; 425/517
[58] Field of Search ................ 426/279, 280, 426/281, 391, 496, 512, 549; 99/353, 386, 432, 423, 427, 349, 430, 515; 425/364 R, 403.1, 517

[56] References Cited

U.S. PATENT DOCUMENTS

| | | | |
|---|---|---|---|
| 4,251,549 | 2/1981 | Fournet et al. | 426/391 X |
| 4,303,677 | 12/1981 | De Acetis | 426/502 X |
| 4,551,337 | 11/1985 | Schmit et al. | 426/503 X |
| 4,721,200 | 1/1988 | Hempenius et al. | 426/496 X |
| 4,842,882 | 6/1989 | Paulucci | 426/502 X |
| 5,074,778 | 12/1991 | Betts, Jr. et al. | 425/394 |
| 5,396,833 | 3/1995 | Atwood et al. | 99/353 |
| 5,417,989 | 5/1995 | Atwood et al. | 426/27 |

OTHER PUBLICATIONS

The Atwood Dock –It Pizza Crust Docker, Operations and Safety Manual, A.M. Mfg. Co., 1995.
Product brochure, "Dock–It Model 32 Automatic Pizza Crust Docker," A.M. Mfg., 1992.

*Primary Examiner*—Esther Kepplinger
*Assistant Examiner*—Milton I. Cano
*Attorney, Agent, or Firm*—Hill, Steadman & Simpson

[57] ABSTRACT

A method and device for docking a rimmed crust carried on an intermittently moving conveyor is provided. The device has a vertical reciprocating piston positioned above the rimmed crest, a plate supported by the piston, a plurality of pins protruding downwardly from the plate in a predetermined docking pattern, a stripper plate supported from and below the plate wherein the stripper plate has a plurality of holes arranged to allow the pins to penetrate therethrough, resilient springs positioned between the stripper plate and the plate to force the stripper plate and the plate apart, and a controller to operate the piston to move the plate toward the conveyor and to lift the plate away from the conveyor. A method of perforating a plurality a rimmed crust of dough is also provided. The method has the steps of providing a docking station having a pin plate with a multitude of pins, a stripper plate, through which the pins penetrate, resiliently mounted to the carrier plate and the pin plate; positioning the stripper plate above at least one piece of dough having a relatively flat center portion and a circumferential rim such that the stripper plate resides within the circumferential rim; moving the pin plate and pins so that the pins perforate the center portion without perforating the circumferential rim; and retracting the pin plate and pins while maintaining the stripper plate against the dough to prevent retraction of the dough by the pins.

15 Claims, 2 Drawing Sheets

METHOD AND APPARATUS FOR DOCKING DOUGH

BACKGROUND OF THE INVENTION

The present invention relates to a method and apparatus for processing dough, and in particular, for automatically docking rimmed pizza dough.

Dough processing equipment is well known. For example, there are a number of devices for dividing a large batch of dough into smaller dough pieces, commonly referred to as dough dividers. Also, there are a number of available devices for accepting small masses of dough and partially forming these masses into balls. These devices are also commonly referred to as rounders. In addition, combinations of dividers and rounders into a single machine are known wherein a large mass of dough is placed into the device and a round dough ball is provided as an output.

Other devices are known for processing dough, for example, for taking dough balls and pressing them into flattened dough pieces. U.S. Pat. No. 4,668,524 discloses such an apparatus. Also, U.S. Pat. No. 5,396,833, assigned to the assignee herein, discloses such a dough processing and shaping device with a heating element operable in an automated process that takes place without human intervention.

SUMMARY OF THE INVENTION

The present invention provides a method and apparatus for docking a rimmed crust carried on an intermittently moving conveyor. The device has a vertical reciprocating piston positioned above the rimmed crust, a plate supported by the piston, a plurality of pins protruding downwardly from the plate in a predetermined docking pattern, a stripper plate supported from and below the plate, wherein the stripper plate has a plurality of holes arranged to allow the pins to penetrate therethrough, resilient springs positioned between the stripper plate and the plate to force the stripper plate and the plate apart, and a controller to operate the piston to move the plate toward the conveyor and to lift the plate away from the conveyor.

A method of perforating a plurality a rimmed crusts of dough is also provided. The method has the steps of: providing a docking station having a pin plate with a multitude of pins, a stripper plate, through which the pins penetrate, resiliently mounted to the carrier plate and the pin plate; positioning the stripper plate above at least one piece of dough having a relatively flat center portion and a circumferential rim such that the stripper plate resides within the circumferential rim; moving the pin plate and pins so that the pins perforate the center portion of the dough without perforating the circumferential rim; and retracting the pin plate and pins while maintaining the stripper plate against the dough to prevent retraction of the dough by the pins.

DETAILED DESCRIPTION OF THE PREFERRED EMBODIMENTS

As mentioned above, U.S. Pat. No. 5,396,833, assigned to the assignee herein, is hereby incorporated herein by reference. For example, FIG. 1 of the present application is a portion of FIG. 1 of U.S. Pat. No. 5,396,833. A portion of a dough forming and docking apparatus is shown generally at 10 in FIG. 1. This apparatus comprises a number of individual components which work together. Referring to U.S. Pat. No. 5,396,833 provides the preliminary steps in a dough forming method and apparatus. However, the present invention can also be used to provide a docking function to any rimmed dough piece, however such dough piece is initially formed, and however such dough piece is presented beneath the docking station embodying the present invention.

Figure 1:
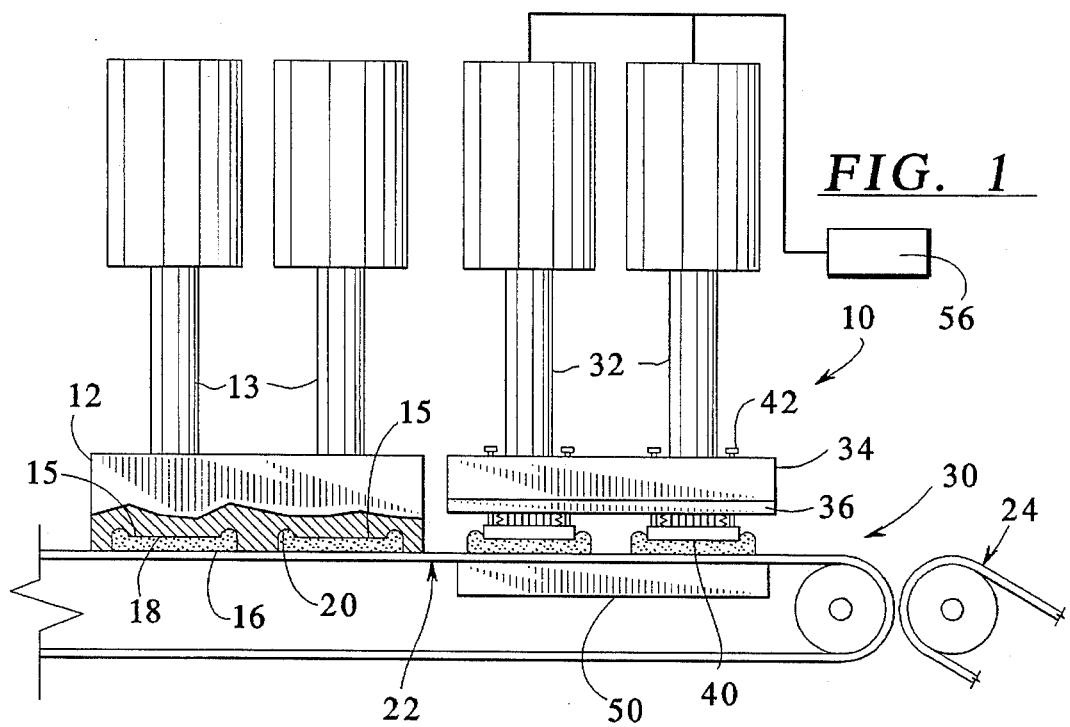
FIG. 1 is a side elevational schematic view of an embodiment of the dough docking apparatus of the present invention including a dough former.

FIG. 1 of the present application illustrates an example of a device where the present invention may be utilized which includes a final pressing and heating plate 12, which may be carried on retractable pistons 13. The final pressing and heating plate 12 is brought downwardly to press dough disks (not shown) into a final desired shape and to apply heat to the shaped dough pieces to cause them to retain their final pressed shape.

In a particular embodiment of the invention, the pressing/heating plate 12 has dies 15 that are used to form shaped pizza crusts. The resulting final pressed shape is a dough crust 16 having a relatively thin central portion 18 and a raised circumferential rim 20. The dough crust 16 is preferably round but may have any shape desired. When the pressing/heating plate 12 is retracted from engagement with an intermittent conveyor 22 on which the dough travels, the conveyor 22 is restarted and the shaped dough crusts 16 are carried along and deposited onto a transfer conveyor 24. Prior to reaching the transfer conveyor 24, the final shaped dough crusts 16 are transported to a docking station 30. The docking station 30 also comprises several components. For example, similar to the pressing/heating plate 12, which has retractable pistons 13, the docking station 30 also has retractable piston 32 which may be pneumatically or hydraulically operated. The docking station 30 can have one, two or more retractable pistons 32 depending on the size of the station. The docking station 30 is shown in enlarged detail and in partial cross-section in FIG. 2 and is described below with reference thereto.

Figure 2:
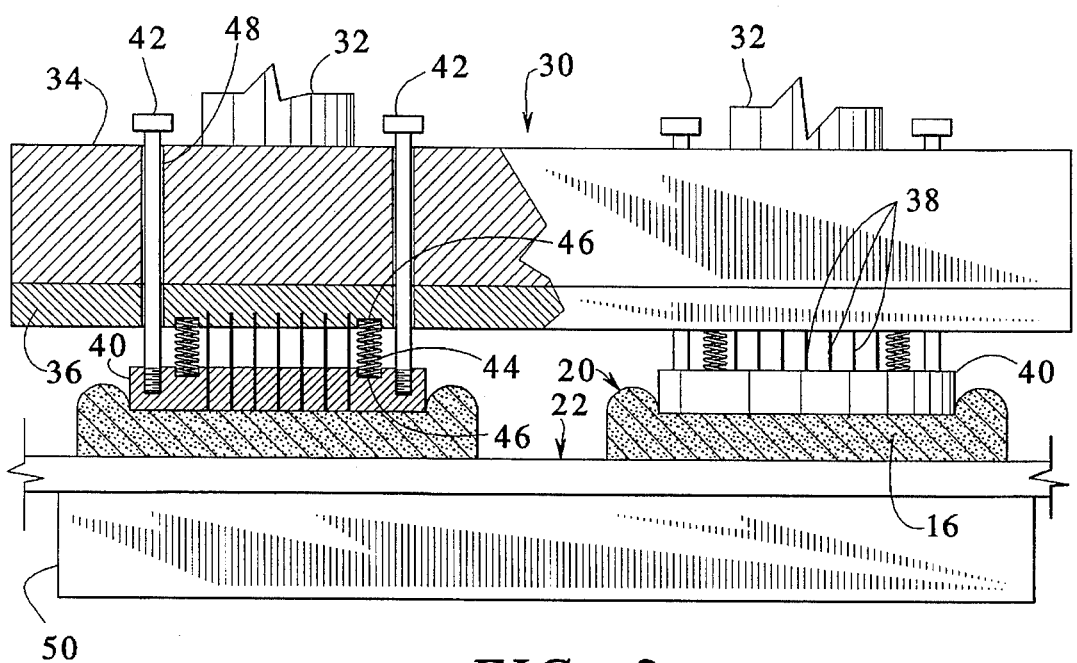
FIG. 2 is an enlarged detail view of a side elevational schematic view, partially in cross section, of an embodiment of the dough docking apparatus of the present invention.

FIG. 2 illustrates several of the components of the docking station 30. For example, the retractable pistons 32 connect to a carrier plate 34. In an embodiment, the carrier plate 34 has approximate dimensions of 32 inches×32 inches. In addition, the carrier plate 34 has a plurality of mounting holes 35 (shown in FIG. 3) arranged in a matrix for attaching other plates thereto. For example, a pin plate 36 is connected to the carrier plate 34 as illustrated in FIG. 2. A typical pin plate 36 may be constructed of half-inch thick aluminum. An embodiment of a pin plate 36 may also have approximate dimensions of 14 inches×32 inches. In addition, the pin plate 36 includes a plurality of pins 38 described further below.

The docking station 30 also comprises a plurality of stripper plates 40. In a particular embodiment, the stripper plates 40 may be constructed of half-inch thick plastic. The stripper plates 40 are resiliently maintained in a spaced relation from the pin plate 36 and the carrier plate 34 by carrier bolts 42 and a plurality of springs 44. Ends of the springs 44 preferably fit within notches 46, located in both the pin plate 36 and the stripper plate 40. The notches 46 hold the springs 44 in position and serve to maintain the springs 44 in a vertical relation perpendicular to the pin plate 36 and the stripper plate 40. The carrier bolts 42 are located in clearance passages 48 through the carrier plate 34 and the pin plate 36. The clearance passage 48 allow the stripper plate 40 to travel unimpeded in a vertical direction while being carried on the carrier bolts 42 and resiliently urged away from the pin plate 36 by the springs 44. However, the clearance passages 48 are narrow enough so that the carrier bolts 42 provide substantially wobble-free travel of the stripper plates 40 thereon. The docking station 30 also includes a heavy plate 50 located directly beneath the docking station 30 under the conveyor belt 22. The heavy plate 50 provides a firm base for facilitating proper operation of the docking station 30 of the present invention.

Figure 3:
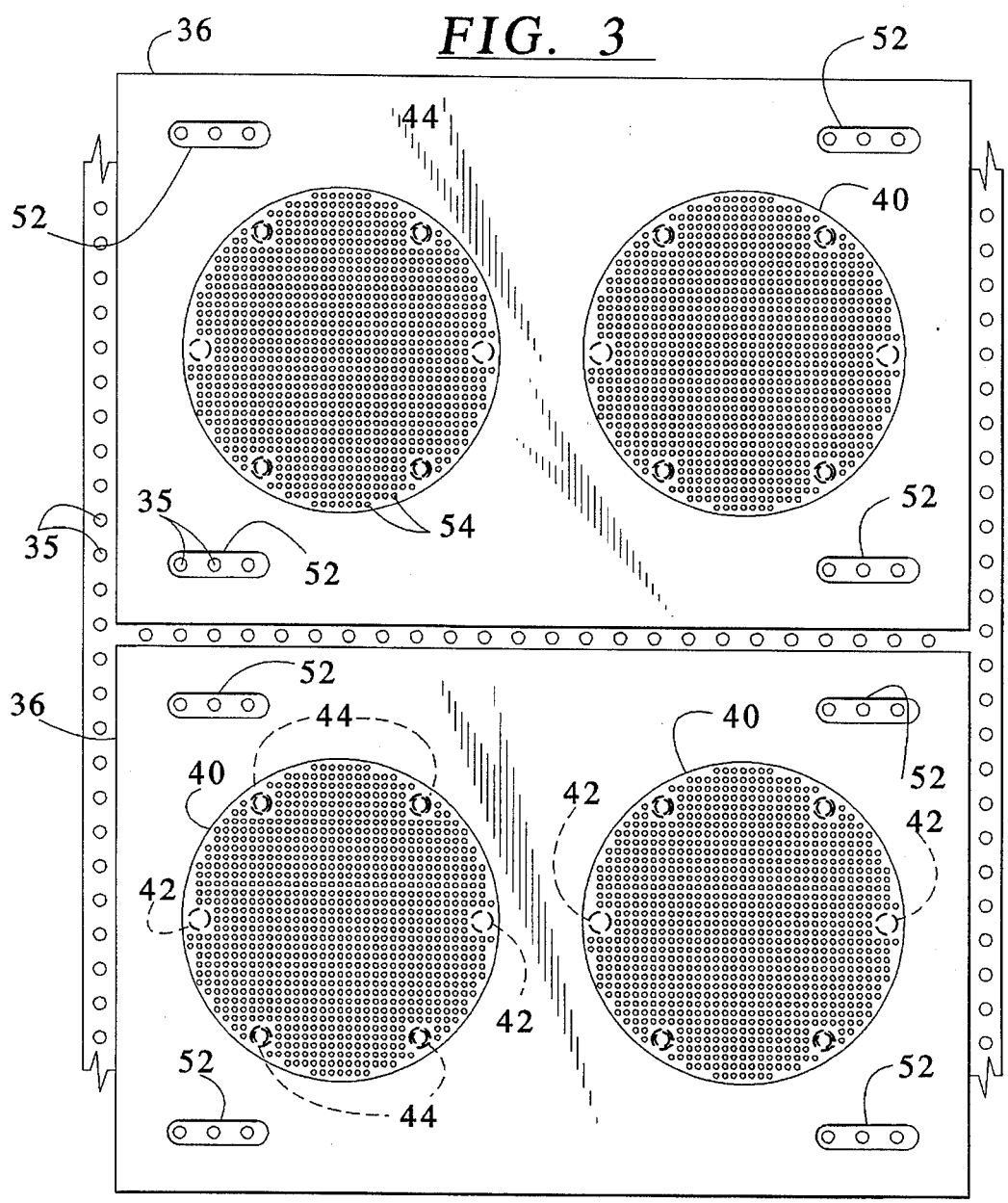
FIG. 3 is a bottom elevational view of an embodiment of a pin plate having a plurality of stripper plates located thereon of the dough docking apparatus of the present invention.

FIG. 3 illustrates a bottom view of an embodiment of the pin plate 36 as well as the stripper plate 40. As illustrated, a plurality of stripper plates 40 are provided on the pin plates 36.

In the illustrated example of FIG. 3, two stripper plates 40 having diameters somewhat less than 12 inches are mounted on one pin plate 36 via the carrier bolts 42 and springs 44. An additional pin plate 36 having two stripper plates 40 is also shown. The two pin plates 36 can both attach to the single carrier plate 34 (see FIGS. 1 and 2) to provide for docking four 12-inch pizza crusts at one time. The diameter of the stripper plate 40 is selected such that it will fit inside of the rim 20 of the crust 16 to be docked. A different number of crusts may be simultaneously docked, as desired, by using different pin plates 36 and stripper plates 40, as described below with reference to FIG. 4.

The pin plates 36 also have mounting slots 52 for adjustably attaching the pin plates 36 to the mounting holes 35 of the carrier plate 34. To allow for fine adjustments, the mounting slots 52 are preferably aligned lengthwise in the direction of travel of the conveyor 22. Also, the stripper plates 40 have a plurality of pins holes 54 located therein. The pin holes 54 correspond to the arrangement of the pins 38 in the pin plate 36. The pin holes 54 have a slightly larger diameter than the pins 38 that penetrate therethrough. The pin holes 54 may be provided in any configuration, i.e. a rectangular matrix grid, a spiral pattern, concentric circles, etc. The pin holes 54 may be spaced an inch apart, for example, or at any desired spacing.

Figure 4:
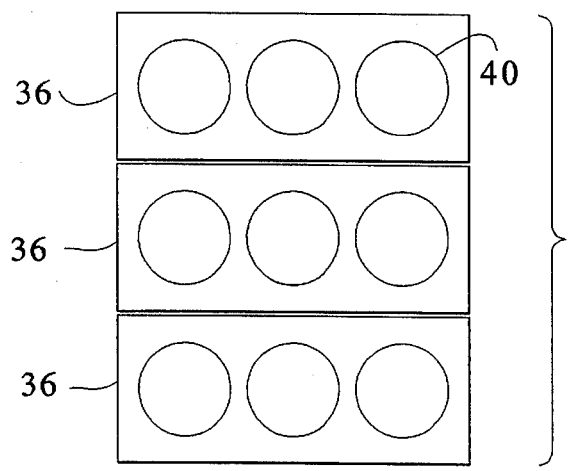
FIG. 4 is a schematic bottom view of an embodiment of a plurality of pin plates and stripper plates of the present invention.

FIG. 4 illustrates a bottom view of a schematic representation of the pin plates 36 having a plurality of the stripper plates 40 located thereon. In this particular embodiment, three stripper plates 40 are placed on each pin plate 36 for a total of a 3×3 matrix of stripper plates. The stripper plates 40 are preferably seven inches in diameter. The smaller stripper plates 40 are used to make smaller personal pan-type pizza crusts. FIGS. 3 and 4 indicate only two of the pin plate/stripper plate orientations possible for the present invention. Because of the plurality of mounting holes 35 located on the carrier plate 34, any number of pin plates 36 may be attached thereto, in any configuration desired.

A description of the method of operation of the present invention with reference to the FIGS. follows. As taught in U.S. Pat. No. 5,396,833, dough is process and transported via the intermittent conveyor 22, i.e. a stepped-type, incremental positional conveyor, until it reaches the pressing/heating plate 12 and is formed into a dough crust 16. The final shaped dough crusts 16 are then incrementally transported and positioned beneath the docking station 30. The positioning of the crusts 16 is properly maintained by the predetermined incremental steps made by the conveyor 22. As mentioned above, adjustments for fine positioning the pin plates 36 can be effected by shifting the pin plates 36 with respect to the carrier plate 34 within the range of the mounting slots 52. Once in position, the retractable pistons 32 are actuated by a controller 56 so that the carrier plate 34 and the pin plate 36 travel vertically downward as illustrated in FIG. 1. Thus, the stripper plates 40 reside within the circumferential rim 20 of the crust 16. Therefore, the stripper plate 40 covers only the center portion 18 of the crust 16 as best illustrated in FIG. 2.

As illustrated in FIG. 1, the docking station 30 is located directly above the heavy plate 50 so that when the method of the present invention is performed, the crust 16 remains stable during the perforation of the crust 16. Thus, an advantage of the present invention is to provide docking at a target area, i.e. the center portion 18 of the crust 16 and also to avoid perforating the rim 20 of the crust 16. To this end, the stripper plate 40 fits within the rim 20. The retractable pistons 32 press the attached carrier plate 34 and the attached pin plate 36 carrying the pins 38 into the pre-positioned crust 16 therebelow. The stripper plates 40 reside within the rim 20 of the crust 16 as shown in FIG. 2. As the pistons 32 travel further downward, the pins 38 then penetrate through the holes 54 in the stripper plate 40 and into the center portion 18 of the crust 16 to perforate only the center portion 18 of the crust 16. As the pistons 32 reach a limit point set by the operator, or bottom out, the pins 38 penetrate some distance into the center portion 18 of the crust 16, however, they should not penetrate all of the way through the crust, or damage to the conveyor belt 22 may occur. The controller 56 can be used to adjust the movement of the pistons 32. After bottoming out, the pistons 32 of the docking station 30 retract to thereby withdraw the pins 38 from the crust 16. Urged by the springs 44, the stripper plates 40 advantageously hold the now perforated crust 16 against the conveyor 22 and the heavy plate 50 so that the pins 38 may retract from the somewhat sticky dough without drawing any dough back into the apparatus of the docking station 30. This prevents the dough from interfering with the operation of the docking station 30. The springs 44 resiliently hold the stripper plate 40 against the flat center portion 18 of the crust 16 during this operation. The retractable pistons 32 then lift the combined carrier plate 34 and pin plate 36 high enough above the crust 16 so that the crust 16 may travel further on the conveyors 22, 24 for subsequent utilization and processing.

Thus, it is seen that the present invention provides an automatic method and apparatus for docking prepared dough disks that have been processed into a final desired shape and at least partially docked by perforating the center flat portion of the dough piece without perforating the rim. This provides for more even baking so that the center portion of the dough pieces does not expand and deform in a subsequent baking process since the docking holes allow the moisture in the dough to escape. The entire operation, following deposit of the large dough mass into the apparatus, is done automatically without human intervention, thus providing a great savings in manufacturing cost for such finished, perforated baked dough pizza crusts.

As is apparent from the foregoing specification, the invention is susceptible of being embodied with various alterations and modifications which may differ particularly from those that have been described in the preceding specification and description. It should be understood that I wish to embody with the scope of the patent warranted hereon, all such modifications as reasonably and properly come within the scope of my contribution to the art.

I claim:

1. A device for docking a rimmed crust carried on a conveyor, the device comprising:

a vertical reciprocating means for positioning and supporting a carrier plate above the rimmed crust;

a plurality of pins protruding downwardly from said carrier plate in a predetermined docking pattern;

a stripper plate supported from and below said carrier plate, said stripper plate having a plurality of holes arranged so that said pins penetrate said plurality of holes in said stripper plate;

resilient means positioned between said stripper plate and said carrier plate for forcing said stripper plate and said carrier plate apart; and control means for operating said vertical reciprocating means to move said carrier plate toward the conveyor so that said plurality of pins pass through said plurality of holes in said stripper plate and into the rimmed crust and to lift said carrier plate away from the conveyor.

2. The device for docking a rimmed crust of claim 1, wherein said vertical reciprocating means comprises at least one pneumatic cylinder.

3. The device for docking a rimmed crust of claim 1, wherein said carrier plate supported by said vertical reciprocating means further comprises a plurality of mounting holes therein.

4. The device for docking a rimmed crust of claim 1, wherein said predetermined docking pattern of said plurality of pins protruding downwardly from said carrier plate comprises a rectangular matrix pattern.

5. The device for docking a rimmed crust of claim 1, wherein said resilient means positioned between said stripper plate and said carrier plate to force the stripper plate and the plate apart comprises at least two springs mounted therebetween.

6. A device for docking a rimmed crust carried on an intermittently moving conveyor comprising:

at least one pneumatic cylinder mounted above the conveyor;

a carrier plate supported by the at least one pneumatic cylinder;

at least one pin plate mounted on the carrier plate;

a plurality of pins protruding downwardly from the pin plate in a predetermined docking pattern;

a stripper plate supported from the pin plate, the stripper plate having a plurality of holes therethrough to receive the plurality of pins;

a plurality of springs positioned between the stripper plate and the pin plate to force the stripper plate and the pin plate apart; and control means to operate the at least one pneumatic cylinder to move the carrier plate toward the conveyor and to lift the carrier plate away from the conveyor.

7. The device for docking a rimmed crust carried on an intermittently moving conveyor of claim 6, wherein said at least one pin plate comprises two pin plates each having two said stripper plates supported from each said pin plate.

8. The device for docking a rimmed crust carried on an intermittently moving conveyor of claim 6, wherein said at least one pin plate comprises three pin plates each having three said stripper plates supported from each said pin plate.

9. The device for docking a rimmed crust carried on an intermittently moving conveyor of claim 6, wherein said at least one pin plate mounted on the carrier plate further comprises:

a plurality of mounting slots constructed and arranged to provide adjustable mounting of the at least one pin plate on the carrier plate.

10. The device for docking a rimmed crust carried on an intermittently moving conveyor of claim 6, further comprising:

at least two carrier bolts constructed and arranged to support the stripper plate from the pin plate and the carrier plate.

11. A method of perforating a plurality of dough pieces comprising the steps of:

providing a docking station having a carrier plate supported by at least one retractable piston, at least one pin plate mounted to the carrier plate and having a multitude of pins, and at least one stripper plate through which the multitude of pins penetrate, the stripper plate being resiliently mounted to and below the carrier plate and the pin plate;

positioning at least one piece of dough having a relatively flat center portion and a circumferential rim below said at least one stripper plate such that the stripper plate overlies said flat center portion;

moving the pin plate so that the pins penetrate the relatively flat center portion without perforating the circumferential rim; and retracting the pin plate and pins while maintaining the at least one stripper plate against the at least one piece of dough to prevent movement of the dough in a retraction direction by the pins.

12. The method of perforating a plurality of dough pieces of claim 11, further comprising the step of:

transporting the plurality of dough pieces on an intermittent conveyor to the docking station.

13. The method of perforating a plurality of dough pieces of claim 11, wherein the step of moving the pin plate so that the pins penetrate the relatively flat center portion without perforating the circumferential rim is further defined such that the pins do not completely penetrate the center portion of the at least one piece of dough.

14. The method of perforating a plurality of dough pieces of claim 11, further comprising the step of:

adjusting the pin plate relative to the carrier plate in the direction of travel of the conveyor.

15. The method of perforating a plurality of dough pieces of claim 11, further comprising the step of:

providing a plurality of pin plates mounted to the carrier plate, each pin plate having a plurality of stripper plates resiliently mounted to and below the pin plate and the carrier plate.

* * * * *